United States Patent
Franko, Sr. et al.

(10) Patent No.: US 8,839,538 B2
(45) Date of Patent: Sep. 23, 2014

(54) TUBE CONTAINER WITH AN INTEGRAL ACCESSORY PANEL

(75) Inventors: Joseph D. Franko, Sr., Ham Lake, MN (US); Joseph D. Franko, Jr., Dayton, MN (US)

(73) Assignee: Quality Assured Enterprises, Inc., Hopkins, MN (US)

( * ) Notice: Subject to any disclaimer, the term of this patent is extended or adjusted under 35 U.S.C. 154(b) by 2816 days.

(21) Appl. No.: 10/919,653

(22) Filed: Aug. 17, 2004

(65) Prior Publication Data

US 2005/0012325 A1  Jan. 20, 2005

Related U.S. Application Data

(63) Continuation-in-part of application No. 10/356,061, filed on Jan. 31, 2003, now Pat. No. 6,786,515, which is a continuation-in-part of application No. 10/005,757, filed on Nov. 2, 2001, now Pat. No. 7,172,220.

(51) Int. Cl.
*B65D 35/24* (2006.01)
*G09F 3/02* (2006.01)
*G09F 23/00* (2006.01)
*G06K 19/077* (2006.01)

(52) U.S. Cl.
CPC *G09F 3/02* (2013.01); *G09F 23/00* (2013.01); *G06K 19/07758* (2013.01); *B65D 35/24* (2013.01)
USPC .......................................... 40/642.01; 222/93

(58) Field of Classification Search
USPC ........................ 40/310, 674; 222/92, 106, 206
See application file for complete search history.

(56) References Cited

U.S. PATENT DOCUMENTS

| | | | |
|---|---|---|---|
| 2,764,829 A * | 10/1956 | Kingman | 40/306 |
| 4,065,033 A | 12/1977 | Nilson | |
| D248,732 S | 8/1978 | Vollmar | |
| 4,688,703 A | 8/1987 | Bayer | |
| 4,888,188 A * | 12/1989 | Castner et al. | 426/109 |
| D312,209 S | 11/1990 | Morrow et al. | |
| 5,076,470 A | 12/1991 | Hatakeyama et al. | |
| 5,111,932 A * | 5/1992 | Campbell | 206/216 |
| D358,760 S | 5/1995 | Sherman et al. | |
| 5,638,990 A * | 6/1997 | Kastberg | 222/106 |
| 5,728,440 A * | 3/1998 | Good | 428/40.1 |
| 5,804,270 A * | 9/1998 | Kawamura et al. | 428/36.92 |

(Continued)

FOREIGN PATENT DOCUMENTS

WO       WO 9846409 A1 *  10/1998  ............. B29C 45/00

OTHER PUBLICATIONS www.cosmeticpackaginganddesign.com/JulyAugust05Feature1.htm, accessed Oct. 12, 2005, printout p. 3 of 4 noted regarding "Tubes with Tools Add Convenience/Difference."

*Primary Examiner* — Charles A Fox
*Assistant Examiner* — Christopher E Veraa
(74) *Attorney, Agent, or Firm* — Walter K. Roloff

(57) ABSTRACT

A tube container with an integral accessory panel includes a tube container formed from a selected tube material. The tube container includes a product dispensing end, an intermediate sealing portion, and a filling end opposite the product dispensing end. The sealing portion is adapted to be sealed subsequent to filling the tube container with a selected product. An accessory panel, integrally formed from the selected tube material, is provided between the intermediate sealing portion and the filling end of the tube container.

49 Claims, 9 Drawing Sheets

(56) References Cited

U.S. PATENT DOCUMENTS

| | | |
|---|---|---|
| 6,321,944 B1 * | 11/2001 | Cetrangolo ............ 222/105 |
| D451,387 S | 12/2001 | Miller |
| D477,215 S | 7/2003 | Mechtold et al. |
| 6,688,495 B2 | 2/2004 | Masuda |
| 6,786,515 B2 | 9/2004 | Franko, Sr. |
| 7,172,220 B2 | 2/2007 | Franko, Sr. |
| 7,241,066 B1 * | 7/2007 | Rosen et al. ............ 401/183 |
| 2003/0047572 A1 | 3/2003 | Masuda |
| 2003/0085564 A1 | 5/2003 | Franko, Sr. |
| 2003/0102362 A1 | 6/2003 | Hammond |
| 2003/0146617 A1 | 8/2003 | Franko, Sr. |
| 2004/0020940 A1 * | 2/2004 | Whitney ............ 222/92 |
| 2006/0138767 A1 | 6/2006 | Franko, Sr. |
| 2006/0145471 A1 | 7/2006 | Franko, Sr. |

\* cited by examiner

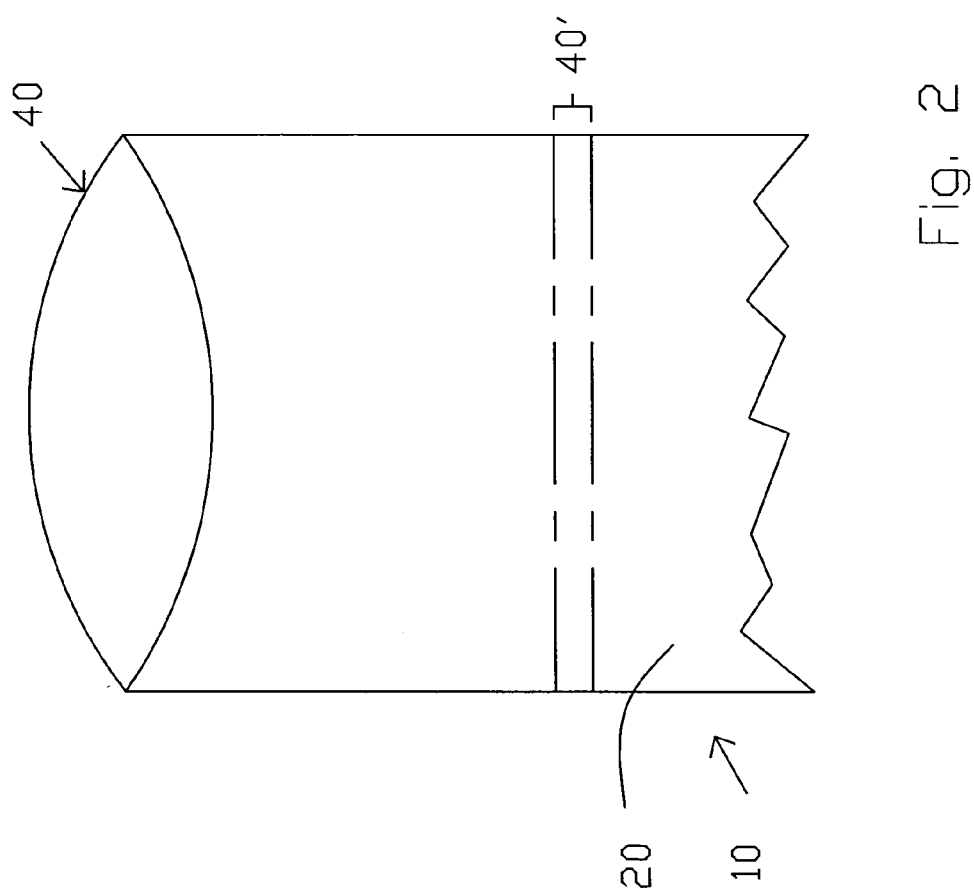

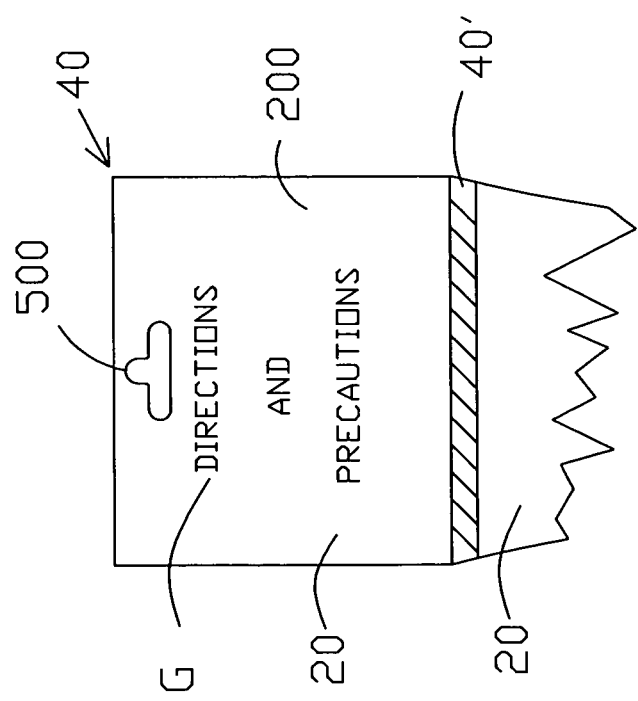

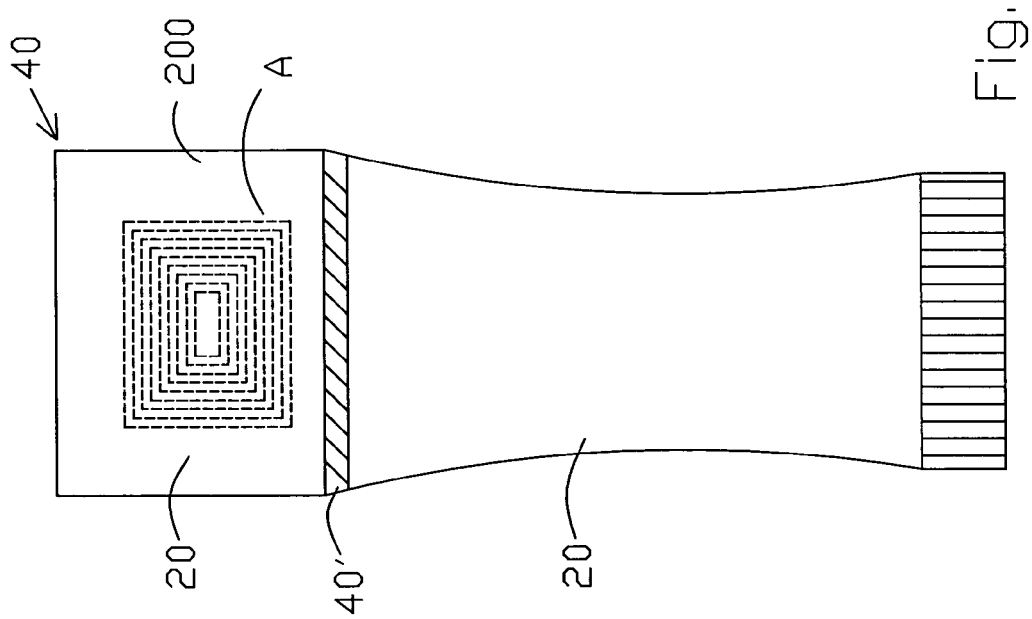

TUBE CONTAINER WITH AN INTEGRAL ACCESSORY PANEL

CROSS-REFERENCE TO RELATED APPLICATION

The present application is a continuation-in-part of U.S. patent application Ser. No. 10/356,061 filed Jan. 31, 2003 now U.S. Pat. No. 6,786,515, which is in turn a continuation-in-part of U.S. patent application Ser. No. 10/005,757 filed Nov. 2, 2001 now U.S. Pat. No. 7,172,220, the disclosures of which are specifically incorporated herein by reference thereto.

FIELD OF THE INVENTION

The present invention relates generally to tube containers. The invention relates specifically to a tube container with an integral accessory panel for carrying one or more accessories such as directly printed graphics, a coupon, a premium, a game piece, an RFID component, or for providing a tool for use with a product within the container, or any combination thereof.

BACKGROUND OF THE INVENTION

In the packaging arts, and in particular in the commercial packaging art for consumer products, there exists a continual demand for packaging which not only appeals to consumers, but which also provides added value or features to a purchaser of packaging materials. In this regard, manufacturers of consumer products and their packaging vendors have devised various techniques for inclusion of, for example, directly printed graphics, a coupon, a premium, a game piece, a radio frequency identification ("RFID") component, or a tool for use with an associated product (hereinafter, collectively, an "accessory") or any number or combination of such elements. Among these techniques is to simply contain the product tube within a box or carton, and provide one or more accessories there within. Obvious drawbacks to these techniques include increased packaging costs and post-consumer packaging waste associated with a box or carton. Another technique that has been employed with limited success for tube containers involves simply attaching the accessory to a wall of the tube container by way of a suitable adhesive. As used here throughout, "tube container", "product tube", "tube-like container", or simply "tube", are all intended to include well known flexible tube product containers and pouches that may not be easily characterized by a set of standard rectangular or cylindrical profiles. However, other than the aforedescribed adhesive attachment method, no provision has heretofore been made for simply and inexpensively providing an accessory directly with a tube container itself. This problem is complicated by the fact that flexible tube containers typically do not have a uniform circumference, and their walls are subject to deformation in use by squeezing to force product out therefrom. Thus, the known secondary packaging technique of adhering the accessory to the wall of the tube container cannot be satisfactorily utilized, due to exposure to deformation and other attendant problems. Consequently, an end user typically removes the adhered accessory from the wall of the container before use. Once removed, the accessory may become irretrievably separated from the container, or may otherwise be lost.

Therefore, there exists a need for a tube container with an integral accessory panel, that may be simply and inexpensively produced and which overcomes the myriad drawbacks of known primary and secondary packaging methods.

SUMMARY OF THE INVENTION

An object of the present invention is to provide a tube container with an integral accessory panel that is inexpensive and simple to produce.

Another object of the present invention is to provide a tube container with an integral accessory panel that provides one or more accessories with a tube container but without the problems associated with deformation, in use, of the container.

Yet another object of the present invention is to provide a tube container with an integral accessory panel that eliminated a need for secondary packaging.

In accordance with the present invention, a tube container with an integral accessory panel includes a tube container formed from a selected tube material. The tube container includes a product dispensing end, an intermediate sealing portion, and a filling end opposite the product dispensing end. The sealing portion is adapted to be sealed subsequent to filling the tube container with a selected product. An accessory panel, integrally formed from the selected tube material, is provided between the intermediate sealing portion and the filling end of the tube container.

BRIEF DESCRIPTION OF THE DRAWINGS

FIG. 2 is a fragmentary illustration of a tube container with an integral accessory panel in accordance with the present invention, shown immediately before filling a product therein.

FIG. 5 is an illustration of an exemplary embodiment of the tube container with an integral accessory panel of FIG. 3*a*, further including an aperture.

FIG. 6 is an illustration of another aspect of the tube container with an integral accessory panel of FIG. 3, after having received an accessory therein.

DETAILED DESCRIPTION OF THE INVENTION

Figure 1:
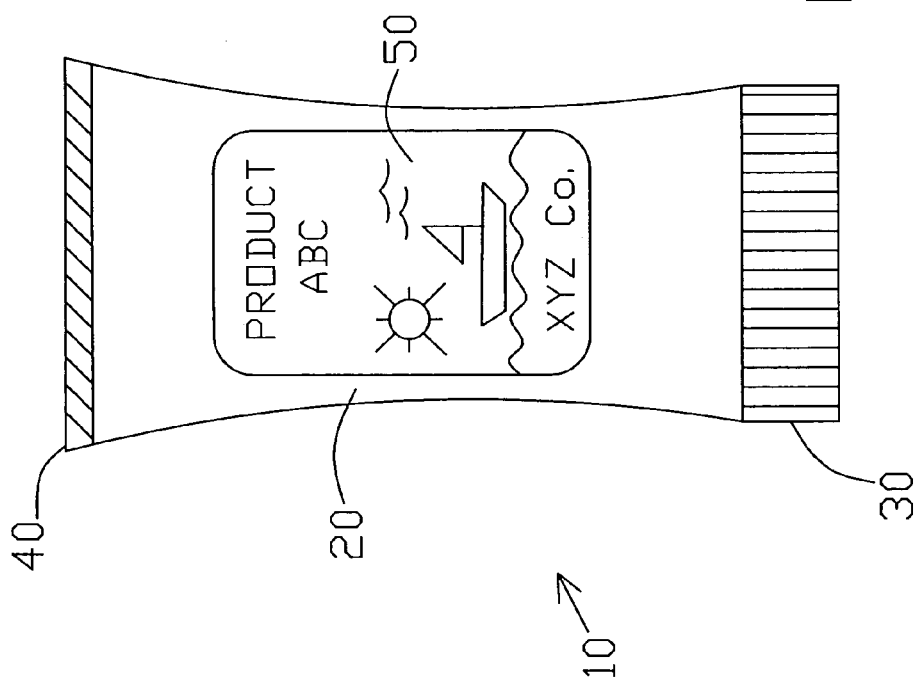
FIG. 1 is an illustration of a typical tube container of the prior art.

Referring to FIG. 1, there shown is a typical prior art tube container 10 which is usually fabricated from a pliable tube material 20. Commonly, the fabrication is accomplished by either a so-called extrusion process, where the pliable tube material may be a plastic which is extruded into a tube, or by a so-called lamination process, where the pliable tube material may be a plastic, a foil, or any combination thereof, which is ultimately rolled or otherwise formed into a tube.

As understood by those skilled in the packaging arts, various plastics, foils, and metals that may be utilized for material 20 may be used in various combinations with each other.

As is well known, container 10 includes a product dispensing end 30 and filling end 40 opposite dispensing end 30. Dispensing end 30 commonly includes a dispensing cap as illustrated whereby a product within container 10 may be squeezed out therefrom.

Container 10 also commonly bears a product identification label or other decoration 50. Decoration 50 may be provided by way of, for example, a simple pressure-sensitive (p-s) adhesive label, or by any number of direct decorating techniques.

Although not shown in FIG. 1, in an assembly line production of a finished consumer product including container 10, a semi-liquid product is introduced thereto via filling end 40. After container 10 has been so filled with the product, container 10 passes in the assembly line to a sealing station employing any suitable method for sealing container 10 at filling end 40, such as by way of so-called "crimp" and/or "seal" methods as are well known.

FIG. 2 depicts tube container 10 of the present invention prior to filling or introduction of a product therein. In the figure, container 10 is fabricated from a pliable selected tube material 20, and includes a filling end 40 which is capable of receiving a desired product in filling container 10. For comparison, an area of container 10 in FIG. 2 corresponding to that area which would have otherwise been sealed as in FIG. 1 (at 40) is identified as an intermediate sealing portion 40'. It is to be understood that the filling of container 10 in FIG. 2 is performed such that the filled product does not extend approximately above an area of container 10 that would have been otherwise sealed (at sealing portion 40') as aforementioned.

Figure 3F:
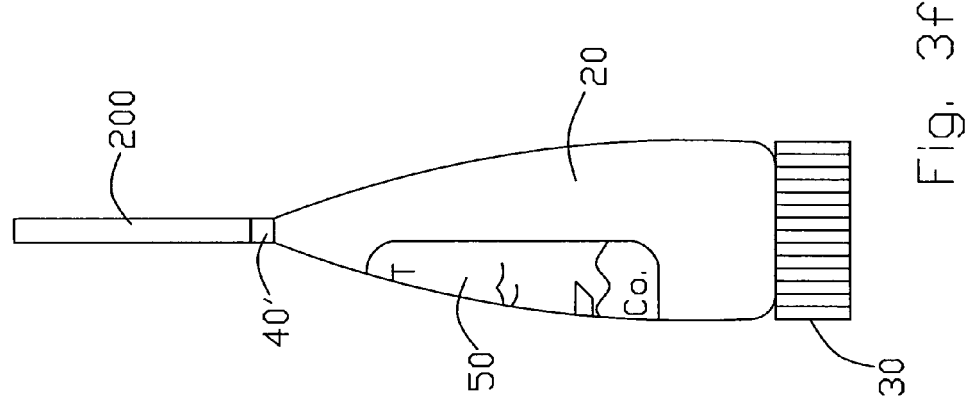
FIG. 3f is a profile illustration of the tube container with an integral accessory panel of FIG. 3.
Figure 3:
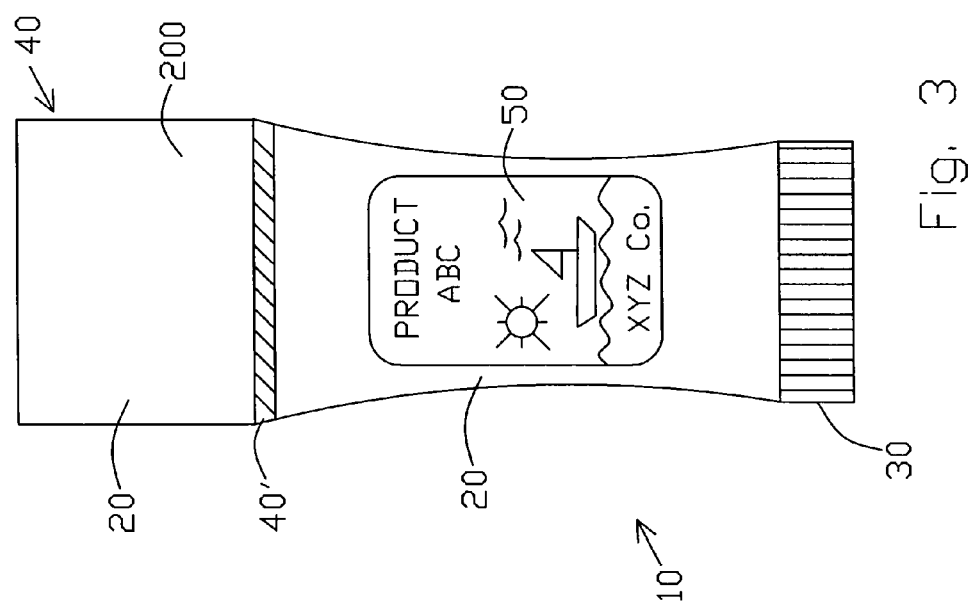
FIG. 3 is an illustration of one aspect of the tube container with an integral accessory panel of FIG. 2, after having been filled with a product and subsequently sealed.

Turning now to FIG. 3, container 10 of FIG. 2 is depicted as having been filled and sealed. Specifically, after filling at end 40, container 10 is sealed at sealing portion 40' to form an enclosed chamber for the product in conventional fashion. This sealing at portion 40' may be done by, for example, any of the aforedescribed sealing methods. An integral accessory panel 200 is then integrally formed in proximity to and between filling end 40 and sealing portion 40' (additionally as shown in FIG. 2) by way of any suitable sealing technique for substantially flattening out and substantially sealing together pliable tube material 20. This flattening and sealing of pliable material 20 integrally creates integral accessory panel 200 from a remaining portion of material 20 between sealing portion 40' and end 40 (again, with additional reference to FIG. 2) with panel 200 thus extending beyond or above, in a bottom-to-top sense, sealing portion 40'. Alternatively, material 20 could be simply sealed by any suitable means substantially about a perimeter of panel 200.

FIGS. 3*a*-3*e* depict various exemplary embodiments of the present invention.

Figure 3A:
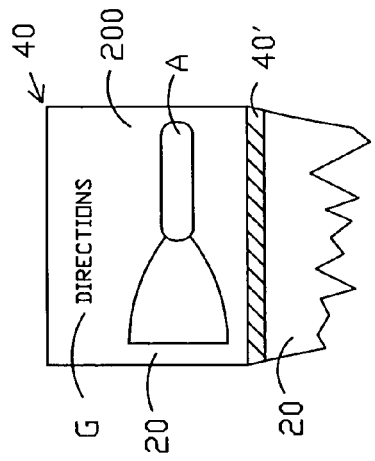
FIG. 3a is an illustration of an exemplary embodiment of the tube container with an integral accessory panel of FIG. 3.

In FIG. 3*a*, a tube container 10 with an integral accessory panel 200 of the present invention includes selected graphics G that have been directly printed on panel 200 by any suitable direct printing technique. It is of course to be understood that any selected portion of panel 200, such as a reverse side not illustrated in the figure, may selectively receive the directly printed graphics G as desired for a particular use. Further, graphics G could advantageously comprise bi-lingual text on opposite sides of panel 200.

Figure 3B:
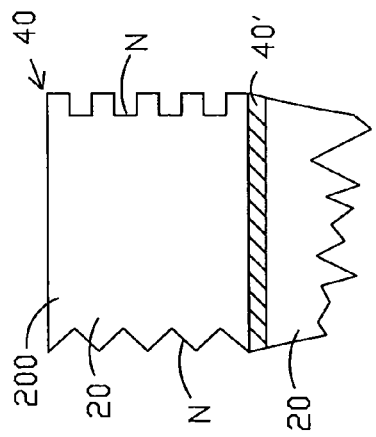
FIG. 3b is an illustration of another exemplary embodiment of the tube container with an integral accessory panel of FIG. 3.

In FIG. 3*b*, a tube container 10 with an integral accessory panel 200 of the present invention is shown where, for example, directly printed graphics G and an accessory A (as defined by way of examples above) have been provided on and secured to, respectively, panel 200. The securing of accessory A to panel 200 may be achieved by any suitable technique such as, for example, by adhesive bonding.

Figure 3C:
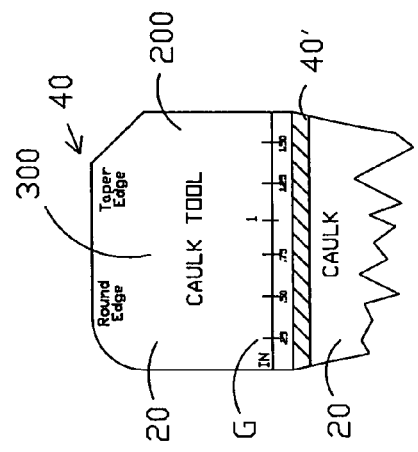
FIG. 3c is an illustration of yet another exemplary embodiment of the tube container with an integral accessory panel of FIG. 3.

In FIG. 3*c*, a tube container 10 with an integral accessory panel 200 of the present invention is shown where panel 200 comprises a tool 300 for use in conjunction with a product contained with the tube. For example, as illustrated, tool 300 serves as a caulk tool for smoothing out dispensed caulk and for measurement by way of ruled graphics G. In such an exemplary embodiment, a user would use the rounded and tapered edges as desired of tool 300 to smooth dispensed caulk (as a substitute for the user's fingers) and the ruled graphics G would provide a handy measuring device.

Figure 3D:
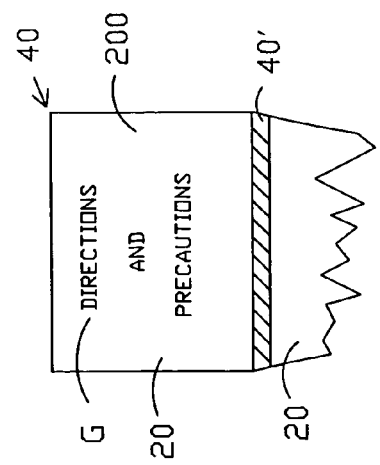
FIG. 3d is an illustration of a further exemplary embodiment of the tube container with an integral accessory panel of FIG. 3.

In FIG. 3*d*, a tube container 10 with an integral accessory panel 200 of the present invention is shown where graphics G enable a user to select various scaled radii and profiles to achieve a desired final shape in a dispensed product for particular needs of a particular project.

Figure 3E:
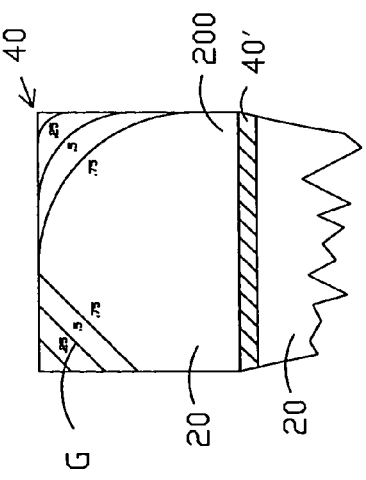
FIG. 3e is an illustration of a yet further exemplary embodiment of the tube container with an integral accessory panel of FIG. 3.

In FIG. 3*e*, a tube container 10 with an integral accessory panel 200 of the present invention is shown where notched edges N may be selected by a user to uniformly lay down the product in trowel-like fashion.

It is to be understood that any of the features generally exemplified with integral accessory panel 200, in FIGS. 3*a*-3*e*, may be employed either alone or in any desired combination with each other.

Figure 4:
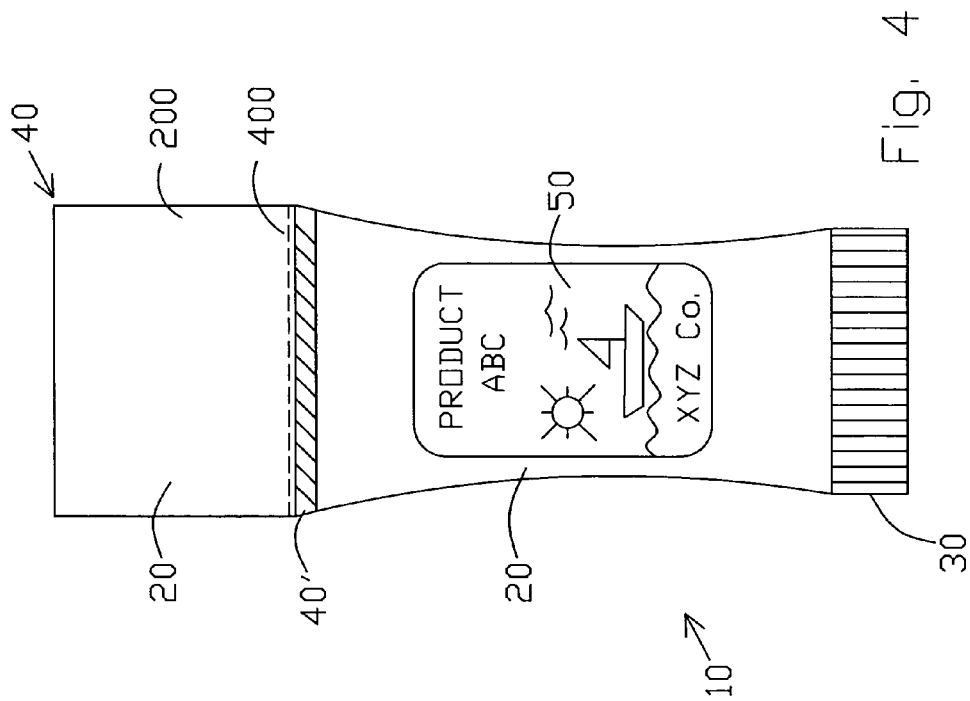
FIG. 4 is an illustration of an exemplary embodiment of the tube container with an integral accessory panel of FIG. 3, further including a tear-off portion.
Figure 4A:
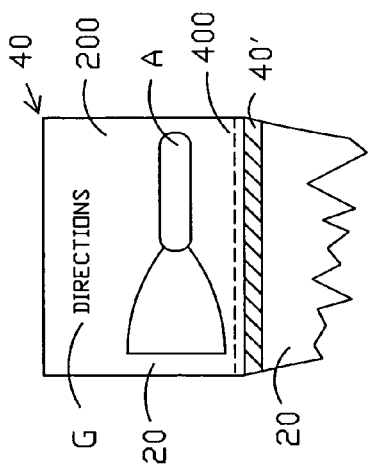
FIG. 4a is an illustration of an exemplary embodiment of the tube container with an integral accessory panel of FIG. 4.
Figure 4B:
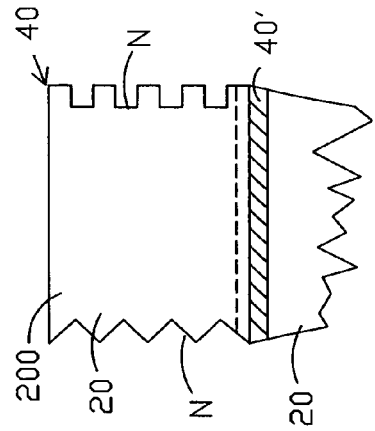
FIG. 4b is an illustration of another exemplary embodiment of the tube container with an integral accessory panel of FIG. 4.
Figure 4C:
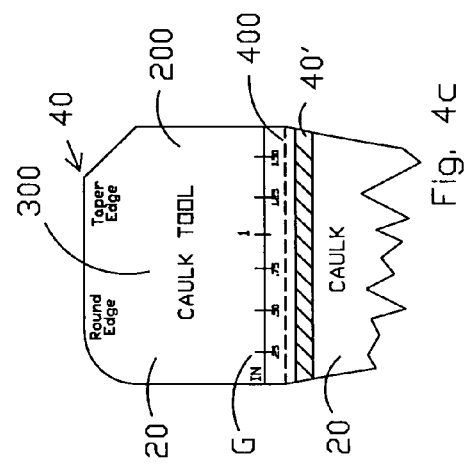
FIG. 4c is an illustration of yet another exemplary embodiment of the tube container with an integral accessory panel of FIG. 4.
Figure 4D:
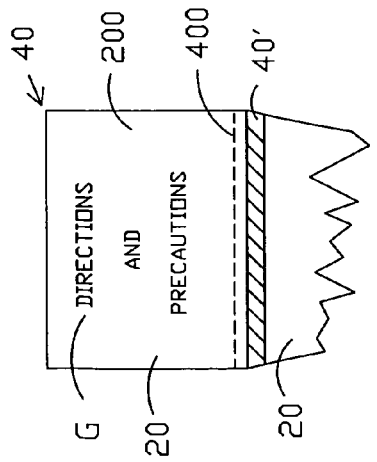
FIG. 4*d* is an illustration of a further exemplary embodiment of the tube container with an integral accessory panel of FIG. 4.
Figure 4E:
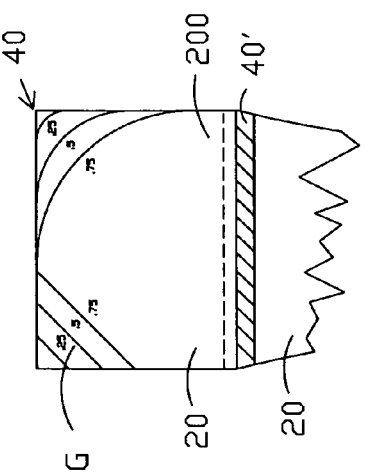
FIG. 4*e* is an illustration of a yet further exemplary embodiment of the tube container with an integral accessory panel of FIG. 4.

Turning now to FIG. 4, an exemplary tube container 10 with an integral accessory panel 200 of the present invention (as shown in FIGS. 3 and 3*f*) further includes a perforated or scored tear-off portion 400. Portion 400 could also be, alone or in combination with the perforation or score, simply a printed "cut or tear along this line" graphics designation. As shown, portion 400 is provided between sealing portion 40' and end 40, and preferably adjacent to portion 40' lengthwise there along. In this embodiment, panel 200 may be permanently removed or torn off from container 10 as may be desired by, for example, a consumer. Provision of tear-off portion 400 is preferably achieved by way of die cut perforations made either during or after the aforedescribed flattening out and sealing together of pliable tube material 20. Although not illustrated, it is to be appreciated that tear-off portion 400 may be selectively provided with additional perforations or more substantial scoring, such that panel 200 is inclined to naturally "fall over" and not be vertically rigid as shown in FIG. 4. This may be advantageous where vertical height considerations are of importance, such as when container 10 is to be placed between store shelves or presented for sale within a carton. Furthermore, this selective scoring or perforation may be provided such that panel 200 is naturally disposed to fall-over in a desired direction (e.g., "backward", so that decoration 50 is not obscured thereby). Additionally, it is to be understood that the aforedescribed tear-off portion may be provided in any desired area of panel 200, as well as being co-located with portion 40'.

It is to be particularly appreciated that with use of accessory panel 200 to carry an accessory A and/or additional graphics G, a consumer's view of the basic product identification and/or decorative label 50 is not obstructed. This is of great importance in "over-the-counter" consumer products where such decorative labels are frequently utilized at great expense and effort to obtain the consumer's attention. Thus, when the present invention is employed with such a label 50, market appeal is not compromised.

FIGS. 4a-4e depict various exemplary embodiments of the present invention specifically including the aforedescribed tear-off portion 400, as have been described relative to FIGS. 3a-3e. Also as aforedescribed, it is to be understood that any of the features generally exemplified with integral accessory panel 200 and portion 400, in FIGS. 4a-4e, may be employed either alone or in any desired combination with each other.

Turning now to FIG. 5, an exemplary tube container 10 with an integral accessory panel 200 of the present invention (as shown in FIG. 3a) further includes an aperture 500 through panel 200. Aperture 500 may be of any size or shape, and may be desired when, for example, container 10 is to be hung on a peg at a point of sale. Although illustrated only with graphics G, aperture 500 may be employed with any of the aforedescribed exemplary embodiments (e.g., FIGS. 3a-3e and 4a-4e).

Figure 6C:
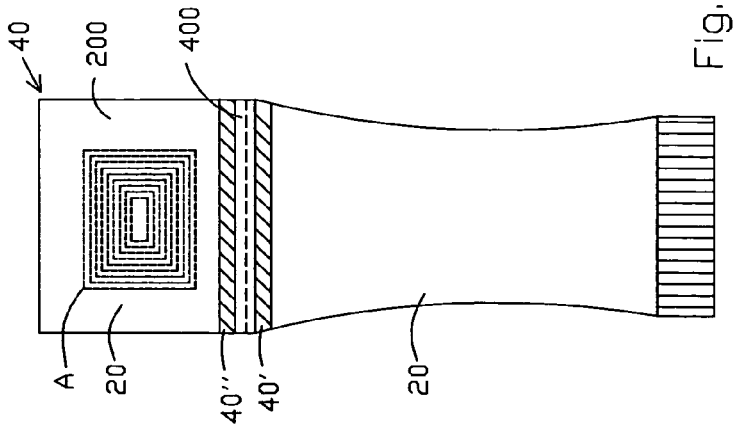
FIG. 6*c* is an illustration of an exemplary embodiment of the tube container with an integral accessory panel of FIG. 6, further including an accessory panel sealing portion.
Figure 6B:
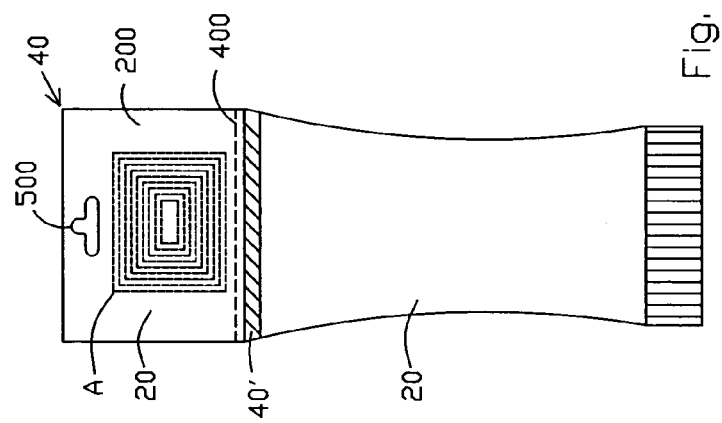
FIG. 6*b* is an illustration of an exemplary embodiment of the tube container with an integral accessory panel of FIG. 6, further including an aperture.
Figure 6A:
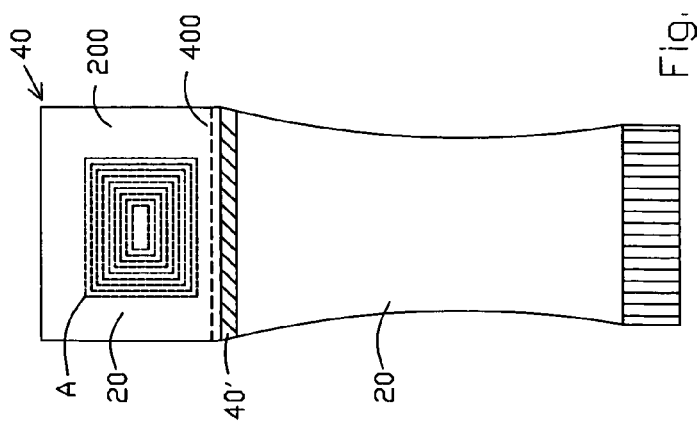
FIG. 6*a* is an illustration of an exemplary embodiment of the tube container with an integral accessory panel of FIG. 6, further including a tear-off portion.

Turning now to FIGS. 6, 6a, 6b, and 6c, and with additional reference once again to FIGS. 2 and 3, an alternative embodiment of the tube container with an integral accessory panel of the present invention is illustrated, with an accessory A provided within panel 200. As may be appreciated with reference to FIG. 2, the sealing of container 10 at sealing portion 40' effectively provides a pocket or compartment within which a desired accessory A may be contained. In one exemplary embodiment, accessory A may be an RFID component which is contained and sealed within panel 200 and thus not visible to a consumer, thereby providing a point-of-sale RFID security feature. In FIG. 6a, an accessory A (once again depicted as an exemplary RFID component) is provided within panel 200 which, in turn, includes a tear-off portion 400 (as in FIG. 4). It is to be understood that use of tear-off portion 400 may provide desired access to accessory A within panel 200, effectively opening panel 200 and allowing extraction of accessory A (e.g., a prize, a game piece, or even extra or alternative product relative to product contained within container 10). In FIG. 6b, an accessory A is provided within panel 200 which, in turn, includes an aperture 500 (as in FIG. 5). In FIG. 6c, an accessory panel sealing portion 40" is provided between tear-off portion 400 and said filling end 40; it will be appreciated in this exemplary embodiment that upon removal of panel 200 from container 10 at tear-off portion 400, panel 200 remains sealed by way of accessory panel sealing portion 40" as may be desired in a particular application where, for example, extra or alternative product is contained within panel 200 and thus is prevented from spilling out therefrom upon use of tear-off portion 400 to detach panel 200 from container 10.

As aforedescribed, it is to be understood that any of the features generally exemplified throughout the foregoing FIGS. 2-5 may be employed either alone or in any desired combination with the embodiments of FIGS. 6, 6a, 6b, and 6c, although not specifically depicted herein.

It is also to be understood that aperture 500 in panel 200 may need to be sealed about its perimeter, to prevent, for example, an extra or alternative product from leaking out from panel 200.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results, or that various accessories may be added thereto.

It is to be understood in general that any suitable alternatives may be employed to provide the tube container with an integral accessory panel of the present invention. Thus, for example, the embodiments of the present invention shown in the figures and described herein may be employed in various combinations and configurations with each other, even though such conceivable combinations have not been specifically illustrated.

Also, it is to be appreciated that panel 200 of the present invention may provide means for conveying additional information to a consumer, which may in turn obviate any need for an individual "point-of-sale" printed carton for container 10, since information otherwise provided on the carton could be incorporated with panel 200.

Further, it is to be appreciated that what has been discussed and depicted as graphics G in the figures could simply be physically stamped into pliable tube material 20.

Although various geometries and shapes have been shown and described, it is to be understood, of course, that any desired regular or irregular angels and shapes relative to, for example, sealing portion 40', accessory panel sealing portion 40", end 40, and panel 200, and any elements associated therewith, may be employed in a desired embodiment of the present invention.

Lastly, the choice of compositions, sizes, and strengths of various aforementioned components are all a matter of design considerations depending upon intended uses of the present invention. For example, although panel 200 has been depicted as being no larger than container 10, it could of course be any desired size or shape.

Accordingly, these and other various changes or modifications in form and detail of the present invention may also be made therein, again without departing from the true spirit and scope of the invention as defined by the appended claims.

We claim:

1. A tube container with an integral accessory panel, comprising:
a tube container formed from a selected tube material, said tube container including (i) a product dispensing end, (ii) a closed and sealed intermediate sealing portion, and
(iii) a filling end opposite said product dispensing end; and an accessory panel integrally formed from said selected tube material between said intermediate sealing portion and said filling end of said tube container, said accessory panel extending beyond said intermediate sealing portion.

2. The tube container with an integral accessory panel of claim 1, wherein selected graphics are printed directly on at least one selected portion of said accessory panel.

3. The tube container with an integral accessory panel of claim 1, wherein said accessory panel comprises a tool.

4. The tube container with an integral accessory panel of claim 1, further including at least one accessory secured to said accessory panel, said accessory being selected from the group consisting of a coupon, a premium, a game piece, and an RFID component.

5. The tube container with an integral accessory panel of claim 2, further including at least one accessory secured to said accessory panel, said accessory being selected from the group consisting of a coupon, a premium, a game piece, and an RFID component.

6. The tube container with an integral accessory panel of claim 3, further including at least one accessory secured to said accessory panel, said accessory being selected from the group consisting of a coupon, a premium, a game piece, and an RFID component.

7. A tube container with an integral accessory panel, comprising:
a tube container formed from a selected tube material, said tube container including (i) a product dispensing end, (ii) a closed and sealed intermediate sealing portion, and (iii) a filling end opposite said product dispensing end; and
an accessory panel integrally formed from said selected tube material between said intermediate sealing portion and said filling end of said tube container, said accessory panel extending beyond said intermediate sealing portion,
wherein said accessory panel further includes a tear-off portion provided proximate to said sealing portion, for selectively removing said accessory panel from said tube container.

8. A tube container with an integral accessory panel, comprising:
a tube container formed from a selected tube material, said tube container including (i) a product dispensing end, (ii) a closed and sealed intermediate sealing portion, and (iii) a filling end opposite said product dispensing end; and
an accessory panel integrally formed from said selected tube material between said intermediate sealing portion and said filling end of said tube container, said accessory panel extending beyond said intermediate sealing portion,
wherein said accessory panel further includes a tear-off portion provided proximate to said sealing portion, for selectively removing said accessory panel from said tube container and wherein selected graphics are printed directly on at least one selected portion of said accessory panel.

9. A tube container with an integral accessory panel, comprising:
a tube container formed from a selected tube material, said tube container including (i) a product dispensing end,
(ii) a closed and sealed intermediate sealing portion, and
(iii) a filling end opposite said product dispensing end; and an accessory panel integrally formed from said selected tube material between said intermediate sealing portion and said filling end of said tube container, said accessory panel extending beyond said intermediate sealing portion,
wherein said accessory panel further includes a tear-off portion provided proximate to said sealing portion, for selectively removing said accessory panel from said tube container and wherein said accessory panel comprises a tool.

10. The tube container with an integral accessory panel of claim 7, further including at least one accessory secured to said accessory panel, said accessory being selected from the group consisting of a coupon, a premium, a game piece, and an RFID component.

11. The tube container with an integral accessory panel of claim 8, further including at least one accessory secured to said accessory panel, said accessory being selected from the group consisting of a coupon, a premium, a game piece, and an RFID component.

12. The tube container with an integral accessory panel of claim 9, further including at least one accessory secured to said accessory panel, said accessory being selected from the group consisting of a coupon, a premium, a game piece, and an RFID component.

13. The tube container with an integral accessory panel of claim 1, further including an aperture through said accessory panel.

14. The tube container with an integral accessory panel of claim 2, further including an aperture through said accessory panel.

15. The tube container with an integral accessory panel of claim 3, further including an aperture through said accessory panel.

16. The tube container with an integral accessory panel of claim 4, further including an aperture through said accessory panel.

17. The tube container with an integral accessory panel of claim 5, further including an aperture through said accessory panel.

18. The tube container with an integral accessory panel of claim 6, further including an aperture through said accessory panel.

19. The tube container with an integral accessory panel of claim 7, further including an aperture through said accessory panel.

20. The tube container with an integral accessory panel of claim 8, further including an aperture through said accessory panel.

21. The tube container with an integral accessory panel of claim 9, further including an aperture through said accessory panel.

22. The tube container with an integral accessory panel of claim 10, further including an aperture through said accessory panel.

23. The tube container with an integral accessory panel of claim 11, further including an aperture through said accessory panel.

24. The tube container with an integral accessory panel of claim 12, further including an aperture through said accessory panel.

25. A tube container with an integral accessory panel, comprising:

a tube container formed from a selected tube material, said tube container including (i) a product dispensing end, (ii) an intermediate sealing portion, and (iii) a filling end opposite said product dispensing end, said intermediate sealing portion adapted to be sealed subsequent to filling said tube container with a selected product; and an accessory panel including an interior pocket, said accessory panel being integrally formed from said selected tube material between said intermediate sealing portion and said filling end of said tube container, said accessory panel extending beyond said intermediate sealing portion and further defining a pocket containing at least one contained accessory therewithin, said at least one contained accessory being selected from the group consisting of a coupon, a premium, a game piece, an RFID component, extra product, and alternative product.

26. The tube container with an integral accessory panel of claim 25, wherein selected graphics are printed directly on at least one selected portion of said accessory panel.

27. The tube container with an integral accessory panel of claim 25, wherein said accessory panel comprises a tool.

28. The tube container with an integral accessory panel of claim 25, further including at least one external accessory secured to said accessory panel, said external accessory being selected from the group consisting of a coupon, a premium, a game piece, and an RFID component.

29. The tube container with an integral accessory panel of claim 26, further including at least one external accessory secured to said accessory panel, said external accessory being selected from the group consisting of a coupon, a premium, a game piece, and an RFID component.

30. The tube container with an integral accessory panel of claim 27, further including at least one external accessory secured to said accessory panel, said external accessory being selected from the group consisting of a coupon, a premium, a game piece, and an RFID component.

31. The tube container with an integral accessory panel of claim 25, wherein said accessory panel further includes a tear-off portion provided proximate to the sealing portion, for permanently removing said accessory panel from said tube container.

32. The tube container with an integral accessory panel of claim 31, wherein selected graphics are printed directly on at least one selected portion of said accessory panel.

33. The tube container with an integral accessory panel of claim 31, wherein said accessory panel comprises a tool.

34. The tube container with an integral accessory panel of claim 31, further including at least one external accessory secured to said accessory panel, said external accessory being selected from the group consisting of a coupon, a premium, a game piece, and an RFID component.

35. The tube container with an integral accessory panel of claim 32, further including at least one external accessory secured to said accessory panel, said external accessory being selected from the group consisting of a coupon, a premium, a game piece, and an RFID component.

36. The tube container with an integral accessory panel of claim 33, further including at least one external accessory secured to said accessory panel, said external accessory being selected from the group consisting of a coupon, a premium, a game piece, and an RFID component.

37. The tube container with an integral accessory panel of claim 25, further including an aperture through said accessory panel.

38. The tube container with an integral accessory panel of claim 26, further including an aperture through said accessory panel.

39. The tube container with an integral accessory panel of claim 27, further including an aperture through said accessory panel.

40. The tube container with an integral accessory panel of claim 28, further including an aperture through said accessory panel.

41. The tube container with an integral accessory panel of claim 29, further including an aperture through said accessory panel.

42. The tube container with an integral accessory panel of claim 30, further including an aperture through said accessory panel.

43. The tube container with an integral accessory panel of claim 31, further including an aperture through said accessory panel.

44. The tube container with an integral accessory panel of claim 32, further including an aperture through said accessory panel.

45. The tube container with an integral accessory panel of claim 33, further including an aperture through said accessory panel.

46. The tube container with an integral accessory panel of claim 34, further including an aperture through said accessory panel.

47. The tube container with an integral accessory panel of claim 35, further including an aperture through said accessory panel.

48. The tube container with an integral accessory panel of claim 36, further including an aperture through said accessory panel.

49. The tube container with an integral accessory panel of claim 31, further including an accessory panel sealing portion provided between said tear-off portion and said filling end.

* * * * *